United States Patent [19]

Kaplan

[11] Patent Number: 4,734,702
[45] Date of Patent: Mar. 29, 1988

[54] PASSIVE RANGING METHOD AND APPARATUS

[75] Inventor: Albert Kaplan, College Park, Md.

[73] Assignee: Litton Systems, Inc., Woodland Hills, Calif.

[21] Appl. No.: 833,730

[22] Filed: Feb. 25, 1986

[51] Int. Cl.⁴ ............................................. G01S 5/02
[52] U.S. Cl. ................................... 342/424; 342/458; 364/458
[58] Field of Search ............... 342/424, 442, 445, 446, 342/423, 450, 451, 458, 126, 127, 156; 364/458

[56] References Cited

U.S. PATENT DOCUMENTS

| | | | |
|---|---|---|---|
| 3,122,741 | 2/1964 | Easton | 342/127 X |
| 3,307,193 | 2/1967 | Kaufman | 342/446 X |
| 3,540,054 | 11/1970 | Broderick | 342/424 |
| 3,728,730 | 4/1973 | Takao et al. | 342/442 |
| 3,935,574 | 1/1976 | Pentheroudakis | 342/424 |
| 3,935,575 | 1/1976 | Leisterer et al. | 342/424 X |
| 4,213,131 | 7/1980 | Kaiser, Jr. | 342/370 X |
| 4,339,755 | 7/1982 | Wright | 364/458 X |
| 4,558,323 | 12/1985 | Golinsky | 364/458 X |
| 4,613,867 | 9/1986 | Golinsky | 364/458 X |
| 4,638,320 | 1/1987 | Eggert et al. | 342/424 X |

OTHER PUBLICATIONS

H. Sargent, III et al.; "A Decametric Long Baseline Interferometer System"; Radio Science; (vol. 5, No. 10; 10/70; pp. 1283–1286).

Nollet et al.; "Advanced VHF Interferometer Spacecraft Tracking System"; Electrical Communication; (vol. 49, No. 3; 1974; pp. 204–217).

Authors: A. R. Baron, K. P. Davis, C. P. Hofmann, "Microwave Journal", Sep., 1982, pp. 59–76.

Primary Examiner—Theodore M. Blum
Assistant Examiner—Bernarr Earl Gregory
Attorney, Agent, or Firm—Poms, Smith, Lande & Rose

[57] ABSTRACT

A method and apparatus for passive ranging from a moving platform to a stationary, non-cooperative emitter utilizes a Long Baseline Interferometer and a Short Baseline Interferometer, the former to provide a very precise, but highly ambiguous, measurement of change in phase occurring between two points along the moving platform's path, and the latter to provide a measurement of the emitter's angular position relative to the platform's path at the two points and to resolve ambiguities in the phase change measurements of the former, resulting in a system with enhanced accuracy over prior art devices which may be used against signals that are phase-coded, frequency-coded or frequency-hopped. An error model and a criterion for optimization of the system in terms of measurement error, interferometer length and orientation, and vibration amplitude are presented.

25 Claims, 6 Drawing Figures

Fig. 6.

| Run | Trajectory | Ranging Time (sec) Actual/480 KT | Range (NM) | Rel. Brg. (Deg) | RMS Error (%) | Theoretical Error (%) |
|---|---|---|---|---|---|---|
| 1 | 2°/sec snake | 24/10 | 12 - 15.6 | 43.6 - 87.5 | 2.9 | 2.2 |
| 1 | 2°/sec snake | 12/5 | 11.9 - 15.8 | 43.6 - 87.5 | 5.4 | 3.7 |
| 2 | 1°/sec snake | 24/10 | 13.3 - 16.3 | 41.6 - 84.5 | 2.8 | 2.2 |
| 2 | 1°/sec snake | 12/5 | 13.1 - 16.6 | 41.6 - 84.5 | 5.6 | 3.9 |
| 3 | closing | 24/10 | 11.4 - 19.2 | 29.8 - 61.5 | 3.8 | 3.8* |
| 3 | closing | 12/5 | 11.1 - 19.6 | 29.8 - 67.8 | 6.7 | 6.7* |
| 4 | 17 NM crescent | 24/10 | 15.6 - 18.6 | 15.1 - 73.9 | 7.6 | 8.8 |
| 4 | 17 NM crescent | 12/5 | 15.5 - 18.8 | 15.1 - 81.9 | 15.2 | 15.9 |
| 5 | 40 NM crescent | 48/20 | 39.4 - 41.9 | 15.0 - 54.8 | 11.7 | 11.0 |
| 6 | 48.5 NM crescent | 60/25 | 46.8 - 50.2 | 15.0 - 48.1 | 13.9 | 12.0 |

* Run 3 was used to estimate the LBI measurement error

PASSIVE RANGING METHOD AND APPARATUS

BACKGROUND OF THE INVENTION

1. Field of the Invention

This invention pertains, in general, to passive direction and range finding, and in particular, to a method and apparatus for passive ranging from a moving platform to a stationary, non-cooperative emitter.

2. Description of the Related Art

The survivability and military effectiveness of low altitude aircraft and surface craft are often strongly dependent upon the ability to locate hostile radar-directed defense weapons quickly and accurately for purposes of their avoidance, evasion, suppression and/or destruction.

There are a variety of methods of passive location of stationary, ground-based emitters from moving platforms, the most common techniques being the azimuth/elevation (AZ/EL) method, conventional triangulation, and the multiple-aircraft time-difference-of-arrival (TDOA) method. These methods may be further subdivided into techniques providing for direction of arrival (DOA) measurements only and those providing both DOA information and range information.

Currently-employed techniques for measurement of DOA comprise either Amplitude Comparison techniques or Phase Interferometry techniques. The former typically consists of four broadbands, orthogonal antennas covering 360° in which a comparison of amplitudes of incoming signals between adjacent antennas provides DOA information. These provide accuracies of from 3° to 10°. (See A. R. Baron, et al., "Passive Direction Finding and Signal Location", *Microwave Journal*, September 1982, pp. 59-76.)

Phase interferometry techniques (in their simplest form) utilize a pair of antennas disposed on the moving platform and spaced apart by a known distance such that a plane wave arriving at an angle relative to the pair is received by one antenna earlier than the other, due to the difference in path length traversed by the wave. If the signals from the two antennas are processed, their phase difference provides an indirect measurement of DOA relative to the antenna pair. Interferometer DOA accuracy is a function of antenna spacing and azimuth and elevation angles, and systems have been built having operational accuracies of from 0.1° to 1° RMS. Interferometers having more than two elements are also known in the art.

In terms of emitter location techniques, TDOA methods are the most accurate, but require a multi-platform (typically 3) system to range on a single emitter, in which the time-of-arrival differences at receivers on the platforms is measured and processed in conjunction with the known position of the platforms to localize the emitter. Since the technique entails multiple platforms and complicated distance-measuring and timing equipment, it is not considered as a suitable ranging method for single moving platform systems.

AZ/EL techniques locate an emitter by measuring the azimuth and elevation angles of arrival of the signal and the altitude of the platform relative to the ground. The slant range is then computed from trigonometric relationships assuming the emitter is also at ground level. The range error is a strong function of target range and altitude, and all other things being equal, provides better accuracy only at large altitudes of platform above the emitter. Significant measurement errors can also result unless external information is available to the system concerning emitter altitude due to topography.

Typical AZ/EL location systems utilize a pair of orthogonal phase interferometers to obtain azimuth and elevation angle information.

Triangulation techniques employ two or more DOA measurements made at subsequent times as the platform traverses its path of motion relative to the emitter and compute range using well-known trigonometric relationships.

The triangulation method may employ either Amplitude Comparison methods or interferometry to measure DOA information. However, since interferometry may provide as much as 10-to-1 improvement in accuracy, interferometry may become the preferred method where system accuracy demands are high, even at the expense of increased system complexity.

This, it is possible to predicate an extremely-precise, passive ranging system for a single moving platform which utilizes either the interferometer-based AZ/EL method or the interferometer-based triangulation method. However, both techniques suffer from certain problems which limit their practical application. First, they require extremely accurate navigation information, particularly platform heading. As indicated above, AZ/EL systems are highly dependent on platform altitude and emitter range and are highly susceptible to terrain-induced errors. Triangulation methods are relatively slow and are dependent upon true bearing spread, i.e., the angle subtended at the emitter by the path of the moving platform between measurements. Also, triangulation becomes ineffectually-inaccurate at small intercept angles, i.e., large angles relative to the interferometer's boresight. Finally, since triangulation requires that the system be able to collect data on the emitter's signal for many seconds, its performance is degraded by intermittent signals, i.e., if the emitter is scanning, or at low platform altitudes in mountainous terrain, signal intercepts may be sporadic, thus reducing system effectiveness.

SUMMARY OF THE INVENTION

It is therefore an object of the present invention to provide a method and apparatus for passive ranging from a single moving platform to a stationary, noncooperative emitter having the enhanced accuracy of an interferometer-based system, yet one which requires only two, brief measurements, separated by several seconds, to calculate range to the emitter, which is independent of platform altitude and/or emitter range, which is faster than conventional triangulation methods, yet effective at small intercept angles, and which reduces the required platform heading accuracy to levels that are readily achieved with current operational systems.

These and other objects and advantages are preferably accomplished in a technique using a fully-resolved Short Baseline Interferometer (SBI) to measure DOA angles at two points along the platform's path, a differentially-resolved Long Baseline Interferometer (LBI) to measure the precise, but highly ambiguous change in phase difference between the two points, and signal processing means, including a computer, for resolving the ambiguities in the LBI measurements by use of the SBI measurements in a process called phase linking. In a narrower aspect, the invention provides a method and apparatus that can function even against phase-coded, frequency-coded or random-frequency-hopped signals. Finally, an error model and optimization criterion are disclosed which, if met, insure that the system will perform with a predictable, enhanced accuracy.

A more complete understanding of the present invention will become evident to those skilled in the art from a consideration of the following detailed description of the preferred embodiments, when taken in conjunction with the accompanying drawings, of which the following is a brief description.

BRIEF DESCRIPTION OF THE DRAWINGS

FIG. 6 presents a summary in table form of the results of the flight tests conducted on the exemplary SBI/LBI system.

DETAILED DESCRIPTION OF THE PREFERRED EMBODIMENTS

Figure 1:
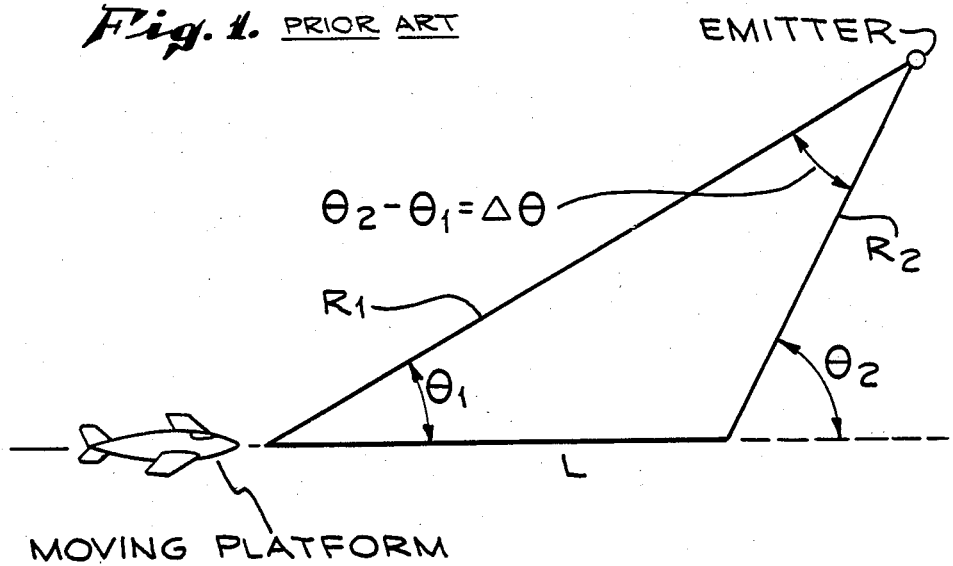
FIG. 1 is illustrative of the geometrical relationships involved in 2-point, passive ranging.

FIG. 1 illustrates the basic geometric relationship which underlies the theoretical model common to all single platform passive ranging techniques. The moving platform traverses the base leg L of the triangle having an emitter located at the apex between sides $R_1$ and $R_2$. Using the law of sines, the range $R_2$ to the emitter is derived as:

$$R_2 = \frac{L \sin \theta_1}{\sin (\theta_2 - \theta_1)}.$$

The sensitivity of range error $E(R_2)$ to errors in the measurements of angles $\theta_1$, $\theta_2$ is obtained by taking the derivative of this equation. Thus, $$E(R_2) = dR_2 = \frac{\partial R_2}{\partial L} dL + \frac{\partial R_2}{\partial \theta_1} d\theta_1 + \frac{\partial R_2}{\partial \theta_2} d\theta_2$$

$$= \frac{\sin \theta_1}{\sin (\theta_2 - \theta_1)} dL + \frac{L \cos \theta_1}{\sin (\theta_2 - \theta_1)} d\theta_1 -$$

$$\frac{L \sin \theta_1 \cos (\theta_2 - \theta_1)}{\sin^2 (\theta_2 - \theta_1)} d(\theta_2 - \theta_1).$$

It may be seen from the foregoing that the error of range $E(R_2)$ decreases as the angle difference $(\theta_2 - \theta_1)$ increases, and that angle difference $(\theta_2 - \theta_1)$ increases with increasing time between measurement points. Thus, in order to minimize range error, it is required that the angular change to the emitter, and hence, ranging time, be maximized. Concomitantly, the only method for reducing ranging time is to improve the accuracy of the measurements. It should be noted that, in the previous equation, the first two terms have in their denominator $\sin (\theta_2 - \theta_1)$, while the third term has $\sin^2 (\theta_2 - \theta_1)$. For this reason, the error in measuring angular change $E (\theta_2 - \theta_1)$ has a much larger effect on range error than the other terms. Thus, an improvement in measuring angular change can be used to: (a) produce improved accuracy in a given ranging time, or, (b) produce a required range accuracy in a shorter ranging time.

Figure 2:
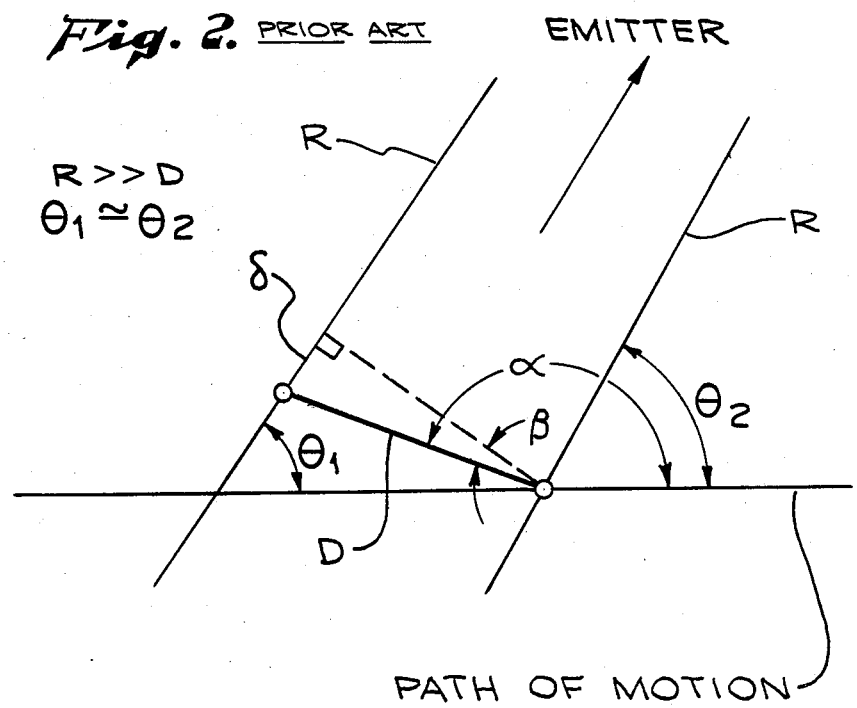
FIG. 2 illustrates the geometrical relationships involved in interferometer techniques.

A 2-element interferometer having length D and oriented at an angle $\alpha$ relative to a moving platform's line of motion is illustrated in FIG. 2. If it is assumed that the distance D between receiving antennas is small compared to the distance to the emitter such that incoming electromagnetic waves can be approximated by plane waves, then such a plane wave striking the antennas at an angle $\theta$ relative to the path of the platform will be received by one antenna earlier than the other, due to the difference $\delta$ in the length of path covered by the wave. If the received signals are then processed, a phase difference $\phi$ results which is proportional to the time difference of arrival, to a modulus of $2\pi$ radians. Thus, $$\frac{\delta}{\lambda} = \frac{\phi}{2\pi},$$

and $\delta = D \sin \beta$,
where $\beta = (\alpha - \theta) - \pi/2$
and $\lambda$ = signal wavelength.
From trigonometry, $\sin \beta = \cos(\theta - \alpha)$.

Hence, $\phi = \frac{2\pi D \cos(\theta - \alpha)}{\lambda}$, and thus, $\theta = \cos^{-1}\left(\frac{\lambda \phi}{2\pi D}\right) + \alpha.$ Differentiation of the above yields the change of phase $d\phi$ with respect to the change in angle of signal arrival $d\theta$. Thus, $$d\phi = \frac{-2\pi D}{\lambda} \sin (\theta - \alpha) d\theta,$$

and $$d\theta = \frac{-\lambda}{2\pi D \sin (\theta - \alpha)} d\phi.$$

Referring to the previously-cited range equation, if it is supposed that two interferometer measurements are made at two points along the platform's path of motion and are taken sufficiently close together such that the changes in angular position of the platform relative to the emitter may be represented by differentials, and substituting $\Delta\theta$ for $(\theta_2 - \theta_1)$ and $V\Delta t$ for L, where V is the platform's velocity between the points of measurement, then the range equation may be written more generally as $$R = \frac{V \Delta t \sin \theta_1}{\Delta \theta}.$$

If the derivative of the angle of arrival in terms of phase is replaced by differentials and then substituted in the above equation for range, an expression is obtained which yields range R in terms of rate of change of phase with time. This phase-rate-of-change method of location equation is given as $$R = \frac{-2\pi DV \sin\theta_1 \sin(\theta_1 - \alpha)}{\lambda \frac{\Delta\phi}{\Delta t}}.$$

In this formulation, since the length of the interferometer can be made arbitrarily long to maximize phase rate of change resulting from platform motion relative to the emitter, improved accuracy can be achieved. However, unless care is taken to account for the $2\pi$ ambiguity inherent in phase measurement, gross error can result. This technique is commonly referred to as the long base line interferometer.

Thus, it is possible for a single Long Baseline Interferometer (LBI) system alone to achieve the ranging measurement to the required degree of accuracy, but this imposes significant system constraints. Since the interferometer can only measure phase to modulus $2\pi$, frequent measurements of phase must be made to observe and account for the transitions from $+\pi$ to $-\pi$. This need for frequent phase measurement can degrade system performance, i.e., if the signal is interrupted due to terrain blockage, or if the transmission is intermittent or brief. In addition, the receiver's ability to range on many targets simultaneously and search for new activity can be degraded due to the unavailability of the receiver.

From the foregoing, it also may be seen that, all other things being equal, very precise measurements of $\theta$ can be achieved for a given phase error $\alpha\phi$ by requiring a very large interferometer aperture, i.e., separation D, between antenna elements. It must also be recalled that, since the interferometer measures phase difference to a modulus of $2\pi$, the largest field of view over which the interferometer can measure the angle to the emitter unambiguously is given by $$\theta_u = 2\cos^{-1}\left(\frac{\lambda}{2D}\right).$$

Accordingly, for the interferometer to have a relatively wide field of view, i.e., on the order of $\pi$ radians, the baseline of the interferometer D must be on the order of a half wavelength or less. But as shown above, accuracy of ranging is maximized for large values of D. Hence, there is a tension in singleinterferometer-ranging systems between the need to measure emitter position with an interferometer having a baseline D long enough to permit accurate ranging calculations to be obtained, while yet retaining a system having an interferometer with a baseline short enough to permit unambiguous measurements to be made at intervals sufficiently far apart to permit phase linking between measurements in a system having a relatively wide field view.

It has been discovered that this conflict can be eliminated while permitting extremely precise measurements of angle difference $(\theta_2 - \theta_1)$ between measurement points without the need for frequent LBI phase measurements in a system which incorporates a fully-resolved SBI to measure unambiguously the angles $\theta_1$ and $\theta_2$ and a differentially-resolved LBI to measure the angular change $(\theta_2 - \theta_1)$ to the emitter. The Long Baseline Interferometer is an extremely precise, but also highly ambiguous measurement technique. However, by using it for measuring angular change only, and not actual angle, its extreme precision can be utilized. Then, by correlating the SBI angular measurements with the LBI measurement such that phase linking is achieved for the LBI measurements, the ambiguities can be reduced to an acceptable level. The use of the SBI yields a solution that can accommodate the loss of signal due to terrain blockage and permits the receiver to be time-shared so that it can be used to range on a number of emitters simultaneously, as well as to perform its primary signal acquisition function. It can be shown that the method of the present invention, by combining the SBI function with the LBI function to achieve phase linking, results in an improvement in accuracy of passive ranging over that of a SBI system alone which is roughly proportional to the ratio of the length of the LBI to that of the SBI, and can be applied to yield improved accuracy in a given amount of time, or alternatively, a given accuracy in a reduced amount of time.

Figure 3:
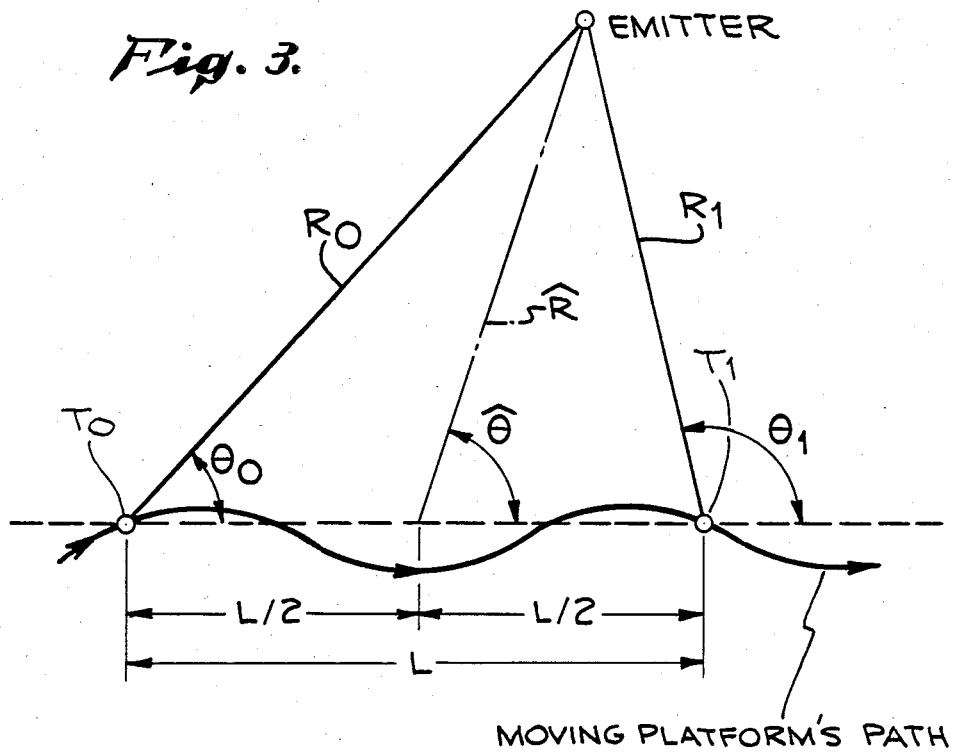
FIG. 3 illustrates the geometrical relationships of the more general 2-point ranging method of the present invention.

FIG. 3 represents a more generalized ranging scenerio for which the basic equations of the present method for passive ranging may be obtained. The moving platform is assumed to follow an arbitrary path relative to the emitter and to be equipped with means for acquiring navigational data (NAV), including altitude, heading, roll, pitch, yaw, and position as a function of time, such as are obtained with known inertial navigation systems. Measurements are assumed to be made at two points in time $T_0$ and $T_1$ along the platform's path, and ranging equations are derived for the midpoint of the straight line segment L between the two points for the range $\widetilde{R}$ and the emitter's angular position $\widetilde{\theta}$ relative to the line segment at the midpoint. Once these midpoint values have been obtained, conventional trigonemetric relationships can then be applied to them to calculate range from the current platform position, any other point in space, or to calculate emitter position in a global reference system, such as latitude and longitude or UTM coordinates.

Thus, using trigonometric relationships and the equation for range derived above, the two equations defining the complete ranging process are as follows:

$$\cot(\widetilde{\theta}) = \frac{\cot(\widetilde{\theta}_0) + \cot(\widetilde{\theta}_1)}{2},$$

and $$\widetilde{R} = \frac{-L\,N_0 \sin(\widetilde{\theta} - \alpha)\sin(\widetilde{\theta})}{\Delta\phi},$$

where $\widetilde{\theta}$ = angular position of emitter relative to line segment L at midpoint;
$\theta$ = angular position of emitter relative to line segment at time $t = T_0$;
$\theta_1$ = angular position of emitter relative to line segment L at time $t = T_1$;
R = slant range of emitter to midpoint of line segment L;
$\alpha$ = angular orientation of LBI relative to platform's line of motion;

$N_0$ = the length of the platform's LBI in signal cycles
= $2\pi D/\lambda$;

and $\Delta\phi$ = the computed, unambiguous LBI change in phase difference between the two points $T_0$ and $T_1$.

Phase linking is accomplished by calculating the number of $2\pi$ rotations which occur between the two ambiguous LBI phase measurements. The process uses the two SBI angles to predict a range in which the unambiguous LBI difference must lie. By managing the error budgets in the system, the width of this range can be made to be $\leq 2\pi$ with a probability of 0.999. The very precise, but ambiguous, LBI phase difference is then referenced to the appropriate $2\pi$ increment. The predicted unambiguous phase difference $\Delta\phi_p$ (in cycles) is given by $$\Delta\phi_p = \frac{N_0}{2\pi} [\cos(\theta_1) - \cos(\theta_0)],$$

and $$\Delta\phi_p - \tfrac{1}{2} \leq \frac{\widehat{\Delta\phi}}{2\pi} + \eta \leq \Delta\phi_p + \tfrac{1}{2},$$

where $\widehat{\Delta\phi}$ is the measured ambiguous phase difference and n is the integer to be solved for. The unambiguous change in phase difference $\Delta\phi$ between points $T_0$ and $T_1$ is then computed from $$\Delta\phi = \widehat{\Delta\phi} + 2\pi n.$$

In the above formulation, the angular positions of the emitter $\theta_0$ and $\theta_1$ are obtained from the computed angular positions of the emitter relative to the platform's instantaneous path of motion at the two points $T_0$ and $T_1$ from $$\theta_i = \cos^{-1}\left(\frac{\lambda\phi_i}{2\pi d}\right) + \beta,$$

where
$\beta$ = the angular position of the SBI relative to the platform's path of motion, and
d = the length of the SBI.

These values and the LBI phase measurement must then be corrected for platform roll and pitch at the two points using convention Euler angle transformations.

Similarly, any difference in aircraft heading at the two measurement points will introduce a LBI phase change which must be calculated and subtracted from the unambiguous phase change. For platform heading angles $H_0$ and $H_1$ at the two measurement points relative to the straight line connecting the two points, LBI orientation angle $\alpha$, and the measured SBI angle $\theta_1$ at the second measurement point, the differential-heading-induced phase change $\Delta\phi_H$ can be calculated from the following:

$$\Delta\phi_H = N_0[\cos(\theta_1 + \alpha + H_1) - \cos(\theta_1 + \alpha + H_o)].$$

This formulation yields better accuracy than one which utilizes both $\theta_0$ and $\theta_1$.

Having obtained the precise range R from the midpoint of the line segment L to the emitter, the precise range $R_1$ from the platform to the emitter at the second point $T_1$ may be readily obtained from:

$$R_1 = \frac{\sin\overline{\theta}}{\sin\theta_1} \widehat{R}.$$

The preferred method for passive ranging from a single, moving platform to a stationary, non-cooperative emitter of a radar signal therefore comprises the steps of:

measuring the wavelength of the signal at two consecutive points along the platform's path;

measuring the unambiguous phase difference of the signal at the two points with a SBI;

measuring the ambiguous phase difference of the signal at the two points with a LBI;

measuring the position and attitude of the platform at and between the points with a Navigation system (NAV);

computing the straight line distance and direction between the two points from the NAV measurements;

computing the unambiguous angular position of the emitter relative to the platform's instantaneous line of motion at the two points from the SBI measurements;

computing the unambiguous angular position of the emitter relative to the straight line segment at the two points from the computed unambiguous angular position of the emitter relative to the platform, corrected for platform roll, pitch, and yaw, at the two points;

computing the ambiguous change in phase difference of the signal between the two points from the LBI measurements;

computing the unambiguous change in phase difference of the signal between the two points from the computed angular positions and the computed ambiguous change;

computing the unambiguous change in phase difference in the signal between the two points, corrected for platform roll, pitch and heading at the two points;

computing the precise slant range and angular position from the midpoint of the line segment to the emitter from the measured wavelength of the signal, the computed length of the straight line, the computed angular positions of the emitter relative to the straight line segment at the two points and the computed, corrected, unambiguous change in phase difference between the two points; and computing the precise slant range and angular position of the platform to the emitter at the second point.

It is to be noted that the previously-presented equations of the foregoing preferred method compute the slant range from the midpoint of the line segment to the emitter. These may be converted to Cartesian range $R_c$ and angle $\theta_C$ by correcting the computed values for measured platform altitude A above the ground from the following equations:

$$R_c = \sqrt{\widehat{R}^2 - A^2}$$

and $$\theta_c = \tan^{-1}\sqrt{\frac{\widehat{R}^2\sin^2(\overline{\theta}) - A^2}{\widehat{R}\cos\overline{\theta}}}$$

Figure 4:
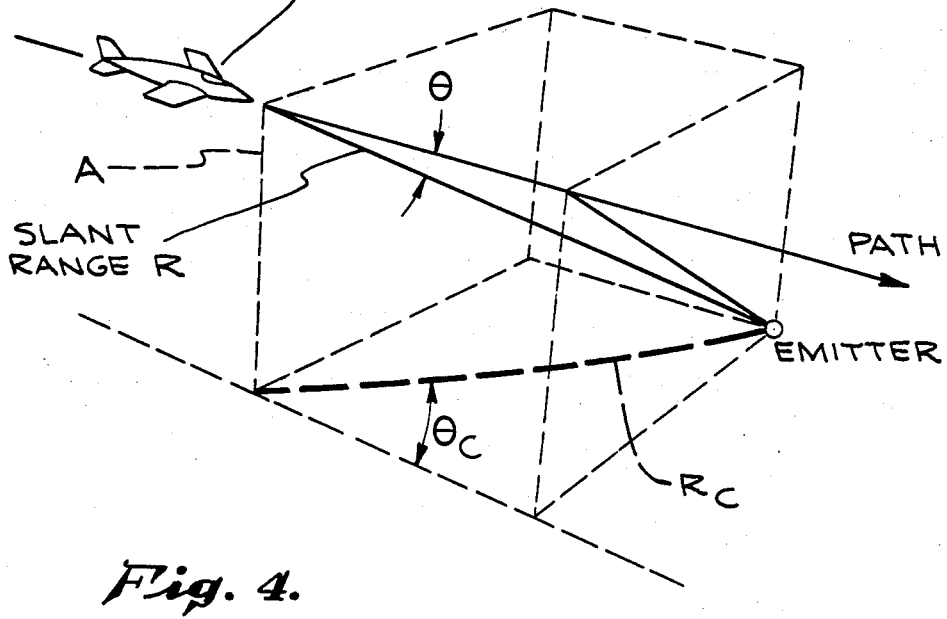
FIG. 4 illustrates the geometrical relationship between the slant range and emitter DOA measurements of the present invention and as converted to Cartesian range and angle.

FIG. 4 illustrates the geometrical relationships between the slant range $\widehat{R}$ and angle $\overline{\theta}$ value and the cartesian range $R_c$ and angle $\overline{\theta}_C$.

The foregoing analysis assumes that the measurements at the two points $T_0$ and $T_1$ are made instantaneously. However, it is known that, in practical systems, system performance can be degraded by signal reflections and other multigraph errors. Accordingly, it is anticipated that, in the preferred embodiment of the method, measurements of the relevant parameters will be conducted only over a brief, initial portion of one or more pulses measured at the two points, in order to minimize this source of error. In particular, it is anticipated that in the exemplary preferred embodiment, the signal parameters will be measured over the first 100 nanoseconds of the pulse, which is well within present day state-of-the-art phase quantizers used for interferometer phase and frequency measurements.

Additionally, it can be shown that, for probabilistic reasons, the noise-induced phase error can be reduced by a factor of $\sqrt{N}$ by averaging the measurements of the relevant parameters over a number of pulses, where N is the number of independent pulse measurements made at each point. Consequently, it is anticipated that, in the preferred embodiment, relevant measurements will be averaged over a plurality of consecutive pulses at each of the two points, and in the exemplary preferred embodiment contemplated, that the relevant parameter will be averaged over at least 12 consecutive pulses at each point.

Accordingly, in an alternative embodiment of the preferred method, the relevant parameters of signal wavelength, SBI phase difference, and LBI phase difference will be measured and averaged over the first 100 nanoseconds of 12 consecutive pulses of the signal at each point.

DESCRIPTION OF AN ERROR MODEL

By differentiating the range equation and dividing by the range, a theoretical error model may be derived having three dominant error terms, whose root-sum-square yields percentage range error. The three dominant error terms are as follows:

$$\frac{E(S)\lambda\sin(2\theta + \bar{\alpha})}{2\pi D_S \sin(\bar{\theta} + \alpha)\sin(\theta)\sin(\bar{\theta} + \beta)},$$

$$\frac{E(H)\sin(2\bar{\theta} + \alpha)}{\sin(\bar{\theta} + \alpha)\sin(\bar{\theta})},$$

and $$\frac{E(L)R\lambda}{L 2\pi D_L \sin(\bar{\theta} + \alpha)\sin(\bar{\theta})},$$

where:
E(S)=SBI RMS phase error,
E(L)=LBI RMS phase error (including vibration),
E(H)=Heading error,
λ=Wavelength,
θ=Angle of emitter from the midpoint of the straight line connecting the two measurement points
α=LBI angle off platform's nose,
β=SBI angle off platform's nose,
$D_S$=SBI length,
$D_L$=LBI length, and
L=Length of straight line segment traversed by platform between measurement points.

From the above theoretical error model, simulation models can be generated to predict and optimize the performance of a SBI/LBI system of the present invention using Monte Carlo simulation techniques. In particular, it can be shown that a critical relationship exists between SBI and LBI dimensions and mounting angles, measurement errors, and LBI vibration amplitude that must be satisfied in order to achieve successful phase linking. This relationship is as follows:

$$KE(\phi)\left[\frac{D_L\sin(\bar{\theta} + \alpha + \bar{E}(\theta))}{D_S\sin(\bar{\theta} + \beta)} + 1\right] + \frac{4\pi A_V}{\lambda}\sin(\bar{\theta} + \alpha) \leq 2\pi,$$

where:
E(φ)=RMS Phase measurement error (random component),
E(θ)=SBI bias error,
$A_V$=LBI vibration amplitude, and
K=A constant which determines the probability of a phase linking error—a value of 8 will yield a 0.1% probability of error.

The value of E (φ) can be adjusted by varying the number of measurements averaged.

If this relationship is not satisfied, the system will make gross errors analogous to the gross errors potentially present in a conventional single interferometer system, and accordingly, it is anticipated that a passive ranging method practiced in accordance with the best mode known of the present invention will satisfy the above relationship.

DISCUSSION OF AN EXEMPLARY SBI/LBI SYSTEM

Figure 5:
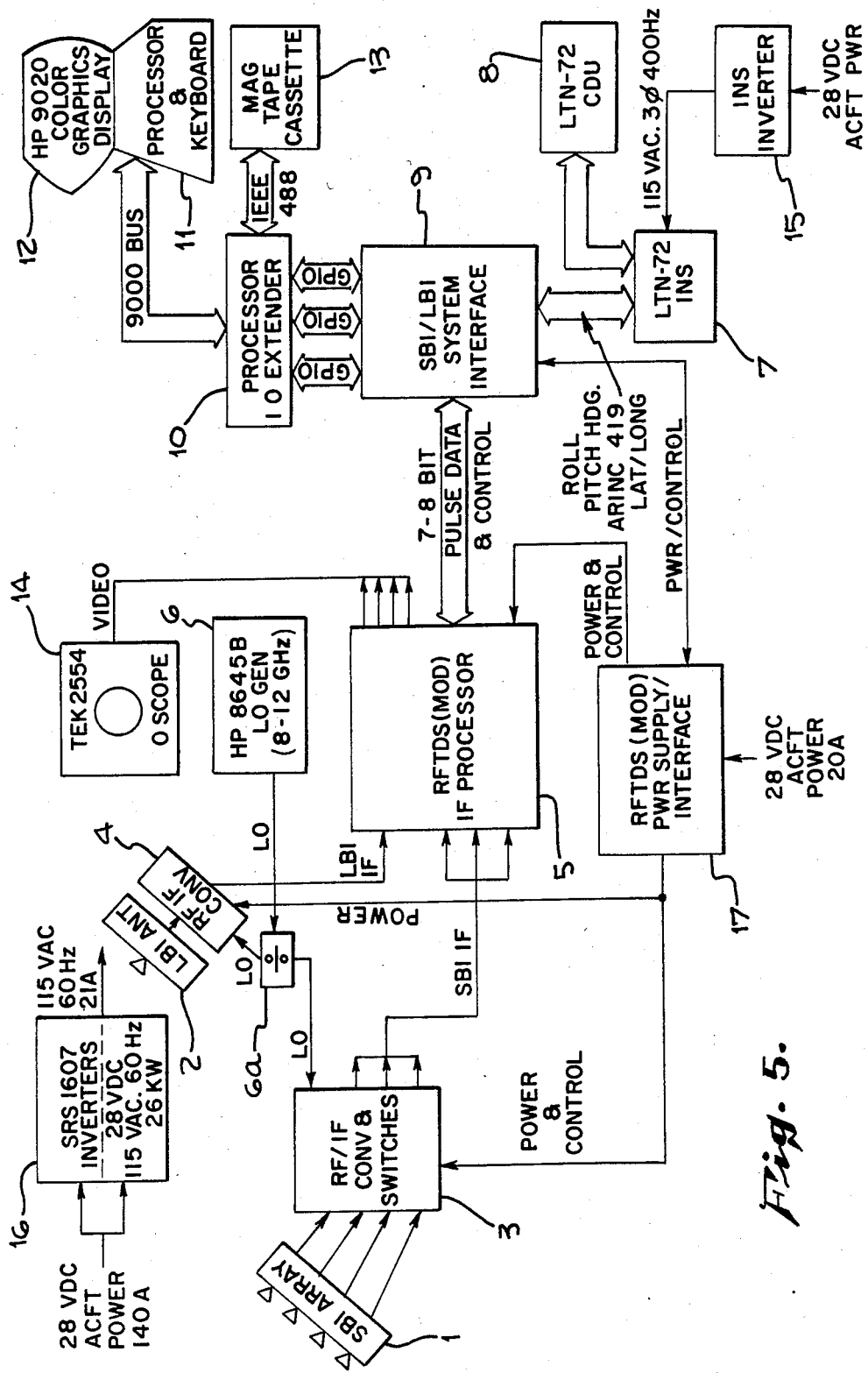
FIG. 5 is a functional block diagram of an exemplary SBI/LBI system which was test flown.

In order to assess the accuracy and performance of a system in keeping with the subject of the present invention, an actual flight test model was constructed, flown and tested. FIG. 5 is block diagram of the SBI/LBI system which was test flown, which included a 9.024"-long, 4-element, Short Baseline Interferometer array 1 and a 142.44"-long, single-antenna LBI array 2 which used the reference antenna in the SBI 1 as a second element. Co-located with their respective arrays were a SBI RF-to-IF converter 3 and a LBI RF-to-IF converter 4 from which the down-converted SBI and LBI IF signals were fed to an IF procesor 5.

A Hewlett Packard 8645B 8-12 GHz synthesizer was used as a manually-tuned local oscillator 6 to deliver an LO signal through a dividing network 6a to the two RF-to-IF converters 3 and 4.

A commercial grade inertial Navigation system (NAV) 7 having a cockpit display unit 8 provided latitude, longitude, roll, pitch and heading information at a rate of 8 measurements per second. An interface unit 9 buffered the pulse measurements provided by the IF processor 5 and navigational and attitude data from the NAV 7, and transferred data through an Input/Output (I/O) extender unit 10 to a digital processor 11 having a color graphics display 12, as well as to digital magnetic tape cassette recorder 13. An oscilloscope 14 was used to monitor signal video as a tuning aid.

Inverters and power supplies 15,16, and 17 were provided to convert 28 VDC aircraft power to a powerform suitable for use by RF-to-IF converters 3 and 4, the NAV 7 and the video processing and/or monitoring equipment, respectively.

The system was installed in a Merlin IV aircraft. Consequently, installation details were more a product of available space and expediency than of system optimization. The SBI antenna array 1 was installed in the nose radome normally occupied by a weather radar. The LBI antenna 2 was installed in the copilot's window. The SBI 1 was installed at an angle of 28.124° relative to the aircraft's centerline at zero degrees pitch and the LBI 2 was installed at an angle of 11.2° relative to the aircraft's centerline at a pitch of 6.0°.

Computer 11 was programmed to provide two modes of operation: One mode provided real time range solutions and displayed the results on color display 12; in the second mode, raw data from IF processor 5 and the NAV 7 was acquired by computer 11 and recorded on its internal magnetic-disk medium. At the end of each test, the data was copied from the disk to a magnetic tape cassette 13 and the disk file erased to provide space for the next test. At the end of each flight, the tape-recorded data was processed on the ground.

The SBI/LBI flight tests were conducted at a test range at a flight facility on Long Island, N.Y. Ground truth was provided by a Nike tracking radar which also served as the target emitter. The characteristics of the emitter were as follows:

Frequency: 8.6 GHz
PRF: 500 pps
Pulse width: 0.25 microseconds
Range Accuracy: 12 meters
Angle Accuracy: 0.1 degrees Time synchronization between the airborne system and the tracking radar clock was achieved with a portable, battery-powered, time standard which was used to set the computer clock on the aircraft. Ground truth data, consisting of time, slant range, azimuth and elevation angles were recorded on magnetic tape, resolvable to the following values:

Time: 0.2 seconds
Range: 1 yard
Angles: 0.01 degrees

Six flight tests were conducted using three different trajectories, encompassing ranges from 10 to 50 nautical miles (NM), angles off the nose of 15 to 90 degrees, and aircraft dynamics of up to 2°/sec. turn-rate and plus-or-minus 20° roll.

The three trajectories used were called "snake," "closing," and "crescent." The "snake" is a flight track with a sinusoidally-varying heading. Two snake flights were flown at 2°/sec. and 1°/sec. turn-rates.

The "closing" trajectory was a nearly-straight-and-level track with a monotonically-changing range and angle to the emitter. One closing trajectory was flown.

The "crescent" trajectory was designed to provide a gradual angular change at near-constant range to the emitter by maintaining a constant turn rate of 0.5°/sec. Three crescents were flown at nominal ranges of 17 NM, 40 NM and 48.5 NM.

Each flight test segment was limited to three minutes duration by the computer 11 disk capacity. Each test segment collected 86,800 monopulse measurements of the three SBI 1 phases, the LBI 2 phase and four signal amplitudes, plus 1440 measurements of aircraft latitude, longitude, roll, pitch and heading. At the end of each test, the data was copied to magnetic tape and the disk space cleared for the next test.

Ground processing was performed in two steps. In the first step, the monopulse data was read back from magnetic tape and pulse measurement averages were calculated. Next, the latitude, longitude, roll, pitch and heading data were read from tape, interpolated to the arrival times of the pulse data, and merged with the average pulse data into single file. The second ground processing step applied the ranging equations to the data in the file and calculated performance statistics. Finally, the measured RMS ranging error was compared to the theoretical error model to assess the accuracy of the theoretical model in predicting error. A summary of the LBI/SBI flight tests is illustrated in the table of FIG. 6. Excluding the two cases involving run 3, which was used to estimate LBI 2 measurement error, the overall RMS error for 13,656 range measurements was 8.9% actual, versus 8.6% theoretical.

EFFECTIVENESS AGAINST CODED SIGNALS

It is to be expected that frequency-swept, phase-coded and frequency-hopped signals could degrade SBI/LBI ranging accuracy if their effect on the method is not understood and compensated for.

An analysis of these effects was performed for another exemplary system utilizing a 20.99" Short Baseline Interferometer oriented 30° from the aircraft centerline and a 204" Long Baseline Interferometer oriented 15° from the aircraft centerline.

In the case of a biphase-coded chirp signal, the SBI and LBI measurement are perturbed by a plus-or-minus 180° phase "glitch" introduced in the phase measurements. The effect on performance depends on the angle to the signal, the video bandwidth and the integration period of the phase measurements.

However, a worst-case analysis for a typical system shows that the worst-case angle for the SBI array is zero degrees and 15° for the LBI. For a signal at zero degrees, the width of the phase glitch is 1.5 nanoseconds, since the difference in path lengths for the SBI is about 18 inches and light travels about one foot/nanosecond. The 10 MHz video filter with a 35 nanosecond rise time attenuates this 180° glitch to about 7.7°. If this is averaged over the 100 nanoseconds of the preferred embodiment, its value will be reduced to about 0.12°, and hence, it is neglible.

In the case of the LBI, and for a 15° relative angle, the path length difference is about 15 feet, and again, the glitch, after passing through the 10 MHz video filter and averaged over 100 nanoseconds, yields an error of about 11.14°. If the platform is assumed to move at a velocity of about 450 NM/hr and the second SBI/LBI measurement made after 10 seconds, the error in the second measurement introduced by the glitch will be 14.09°. The resultant error in the phase difference is a neglible 2.95°.

Thus, in a worst-case scenario for the system modeled, it has been shown hueristically that the phase-coded signals will have a neglible impact on the system of the present invention. It is to be further noted that, if a pseudo-random phase coded signal is assumed, the 12-pulse averaging method of the preferred embodiment further reduces the error. Assuming plus or minus 180° phase changes are equally likely, it can be shown that the error discussed above are further reduced by a factor of 6.

In the case of frequency-swept signals, it will be shown that these have the least impact on SBI/LBI ranging performance. The effect of the linear-swept FM will cause two types of anomalies: One is that the phase measurement at each antenna will be made at varying frequency. This could effect the bias error. The second is only relevant for very long baseline interferometers where the time separation between the antennas produces a frequency offset which could result in an added phase error.

In the case of the first error, the exemplary preferred embodiment of the present invention contemplates that the phase and frequency measurements will be averaged over the initial 100 nanoseconds of the pulse, as discussed above. Since measurement paths are matched, the average phase measurements will be consistent with the average frequency and no degradation in ranging accuracy will result.

For the second type of error, performance will be degraded in direct proportion to the slope of the linear FM within the pulse. If a worst-case signal is postulated having a pulse width of one microsecond and linear FM of 100 MHz, the slope of the signal will be 100 MHz per microsecond. An Interferometer receives the signal at one antenna before it is received at the other, due to the spacing between the antennas, the time delay increasing with the antenna spacing. Since the two channels processed at the phase detector are offset in time (and therefore frequency), a phase offset that could degrade performance will result. It can be shown that the frequency chirp phase offset $\phi_C$ is given by:

$$\phi_C = 2\pi D \cos(\theta + \alpha) \cdot C \cdot \text{chirprate} \cdot t_s,$$

where
C = the speed of light, and
$t_s$ = measurement period.

For the worst-case geometry predicated above, the phase offsets are a neglible 0.09° for the SBI and 1° for the LBI. Accordingly, it is anticipated that the SBI/LBI system of the present invention will function accurately in all hostile environemts meeting the worst-case scenario discussed above which, in turn, exceeds that of and presently-known threat signal.

In the case of frequency agile signals, two requirements must be met to achieve SBI/LBI ranging performance against signals having a wide RF agility range and random pulse frequency pattern. The first requirement is to correctly phase link pulses that occur at different frequencies. The second requirement is to correct the phase errors that are caused by the difference in linked pulse frequencies.

In order to accommodate these processes, a change must be made in the SBI/LBI data collection process of the preferred embodiment, as follows: When a frequency agile radar is detected, the wavelength and LBI phase difference over a number of pulses N are measured and stored in a processor, instead of averaging the set of measurements, as is done in the case of frequency stable emitters. When the second measurement is made, a pairing process is used to find pulse-pairs within a desired frequency range $\Delta F$. When a sufficiently-large set of pulse-pairs falling within the specified frequency range $\Delta F$ are found, a frequency offset phase correction is first done on the ambiguous measured LBI phase differences, the results averaged, and then phase-linked.

A tradeoff must be made to optimize the value of $\Delta F$ and the number of pulses N that are stored and processed. The optimization process is to find a value for 66 F which is sufficiently small such that the phase error resulting from the frequency offset phase correction in the LBI does not degrade either ranging accuracy or phase linking probability of error, and sufficiently large such that there is a high probability of finding at least 12 pulse pairs to meet the averaging criteria of the preferred embodiment. In order to accomplish this process, the algorithm for frequency offset phase correction is first derived, its derivative taken to assess its error characteristics in terms of the particular system under consideration and the accuracy constraints which must be met, and from these criteria, the value of $\Delta F$ and the number of measurements N needed to provide a high probability of achieving phase linking is predicted.

Thus, for the ambiguous phase value $\phi_2$ measured at $F_2$, the ambiguous phase value $\phi_1$ measured at frequency $F_1$, the SBI angle measurement $\theta$, and LBI orientation $\alpha$, the phase correction is given by the equation:

$$\phi_{F2} - \phi_{F1} = \frac{2\pi D_L \cos(\bar{\theta} + \alpha)(\lambda_1 - \lambda_2)}{\lambda_1 \lambda_2} + \Gamma,$$

where $\Gamma$ is a phase bias term which may occur if there is a difference in cable length from the LBI antenna and the reference antenna to the phase detector. Since the cable length difference will be known, this term is calculated. It has no effect for pulses having the same frequency.

If the derivative of this equation is taken and the SBI angle measurement error term substituted, the following error equation results:

$$E(\phi_{F2} - \phi_{F1}) = \frac{D_L(\lambda_2 - \lambda_1)\sin(\bar{\theta} + \alpha) \cdot E(\phi)}{D_S \lambda_1 \sin(\bar{\theta} + \beta)}.$$

For the exemplary system modeled and tested, the frequency offset correction error is maximum at 2 GHz and 120° off the nose of the platform. However, at this angle, SBI angle measurement error dominates the ranging accuracy. The angle at which range error is most sensitive to LBI phase measurement error is 82.5°. Thus, at 2 GHz, 82.5 degrees:

$$E(\phi_{f2} - \phi_{F1}) = 0.005 \, \Delta F \, E(\phi).$$

This equation represents monopulse error. However, 12 pulses will be averaged in the preferred embodiment before processing proceeds. Thus, with an assumed random distribution in frequency, $\Delta F$ can be treated as a random variable with a uniform distribution of from $-\Delta F$ to $+\Delta F$. Its RMS value is then 0.167 $\Delta F$ after averaging 12 pulses. This yields $$E(\phi_{F2} - \phi_{F1}) = 0.000837 \, \Delta F E(\phi).$$

If this error is held at less than one-fourth of the random LBI phase measurement error, it will have neglible effect on phase linking performance and ranging accuracy. Thus, for the exemplary system discussed, with a bias error of 10°, $\Delta F$ should be less than about 96 MHz. This reduces the bias error to 0.8°, which is neglible when compared to the other errors.

The remaining element in the tradeoff is to evaluate the number of measurements needed to provide a high probability of finding at least 12 pulse pairs to process. The probability of a single pulse pair falling within $\Delta F$ in a 250 MHz bandwidth is $$P_P = \frac{\Delta F(500 - \Delta F)}{(250)^2}.$$

The probability of at least 12 pairs being found in a NXN search is $$P_{12} = \overset{11}{\underset{i=0}{\pi}} [1 - (1 - P_P)]^{(N-i)^2}.$$

The following table tabulates $P_{12}$ for $\Delta F = 96$ MHz:

| N | P/12 |
|---|---|
| 12 | .607 |
| 13 | .979 |
| 14 | .998 |

Thus, for the exemplary system, only two additional measurements are necessary in order to locate 12 pairs of matching pulses with a probability of 0.998. In the 0.2% of the cases when only 11 pairs can be found, range error increases by a very small factor of 1.05. There is no effect on phase linking, since there is ample margin at 2 GHz.

As will be evident by now to those skilled in the art, the SBI/LBI ranging technique of the present method works in real applications, in the presence of vibration, multipath, radome effects, aircraft maneuvers and measurement errors. There is excellent correlation between the measured flight test results and the theoretical error model presented above. This correlation validates the error model as an effective tool for predicting the installed performance of a variety of systems, and against all commonly-known signal-coded target emitters. Accordingly, the particular system described hereinabove and in the flight test example should be taken as exemplary in nature, and the spirit and scope of this invention should be limited only by the claims appended hereto.

I claim:

1. An improved passive ranging method of the class which includes measuring the ambiguous change in phase of an emitter's signal occurring between a plurality of points along a path separated by arbitrary periods of time and distance with a Long Baseline Interferometer (LBI) mounted on a platform moving between said points, wherein the improvement comprises the steps of: measuring said phase unambiguously and sequentially at said points with a Short Baseline Interferometer (SBI) mounted on said platform, using said SBI unambiguous phase measurements to estimate range, and using said established range to resolve the ambiguity in said LBI change in phase measurements.

2. An improved passive ranging method of the class which includes measuring the ambiguous change in phase of an emitter's signal occurring between a plurality of points along a path separated by arbitrary periods of time and distance with a Long Baseline Interferometer (LBI) mounted on a platform moving between said points, wherein the improvement comprises:

measuring said phase unambiguously and sequentially at said points with a Short-Baseline Interferometer (SBI) mounted on said platform;

measuring the wavelength and unambiguous phase difference of said signal at said plurality of points with said Short Baseline Interferometer (SBI);

computing the unambiguous angular position of said emitter relative to said path at said points from said SBI measurements;

predicting the range within which the unambiguous LBI phase difference must lie from said computed angular positions;

computing the integer number of $2\pi$ rotations occurring in said signal between said points from said predicted range and said ambiguous measurements; and computing the unambiguous LBI change in phase between said points from said ambiguous change and said computed number of $2\pi$ rotations.

3. The method of claim 2, wherein the relationship between said SBI and LBI, including dimensions, mounting angles, measurement errors and vibration amplitude, satisfy the following criterion:

$$KE(\phi)\left[\frac{D_L \mathrm{Sin}(\bar{\theta} + \alpha + \bar{E}(\theta))}{D_S \mathrm{Sin}(\bar{\theta} + \beta)} + 1\right] + \frac{4\pi A_V}{\lambda} \mathrm{Sin}(\bar{\theta} + \alpha) \leq 2\pi,$$

wherein:
$E(\phi)$ = RMS phase measurement error (random component),
$D_L$ = LBI length,
$D_S$ = SBI length,
$\bar{\theta}$ = emitter angle from the midpoint of the straight line connecting the two measurement points,
$\alpha$ = LBI angle from platform centerline,
$\beta$ = SBI angle from platform centerline, $\bar{E}(\theta)$ = SBI bias error,
$A_V$ = LBI vibration amplitude, $\lambda$ = Signal wavelength, and
K = A constant.

4. A method for passive ranging from a moving platform to a stationary, non-cooperative emitter of a pulsed signal, comprising the steps of:

measuring the wavelength of at least a portion of at least one pulse of said signal at first and second points along said platform's path;

measuring the unambiguous phase difference of at least a portion of at least one pulse of said signal at said first and second points with a Short Baseline Interferometer (SBI);

measuring the ambiguous phase difference of at least a portion of at least one pulse of said signal at said points with a Long Baseline Interferometer (LBI);

measuring the position and attitude of said platform at and between said points with a Navigation system (NAV);

computing the length and direction of a straight line between said points from said NAV measurements;

computing the unambiguous angular position of said emitter relative to said straight line, corrected for roll, pitch and heading of said platform, at said first and second points, from said SBI and NAV measurements;

computing the ambiguous change in phase difference of said signal between said points from said LBI measurements;

computing the unambiguous change in phase difference of said signal between said points, corrected for roll, pitch and heading of said platform at said points, from said computed angular positions, said NAV measurements, and said computed ambiguous change; and computing the slant range and angular position of said emitter relative to the midpoint of said straight line from said measured wavelength of said signal, said computed length of said straight line, said computed angular positions of said emitter relative to said straight line at said points and said computed, unambiguous change in phase difference between said points, whereby the present angular position and range of said emitter relative to any other point in space may be computed.

5. The method of claim 4, wherein said steps of measuring said signal's wavelength, unambiguous phase difference, and ambiguous phase difference at said first and second points further comprise the steps of:
measuring said values over an initial portion of at least one pulse of said signal and said points; and
averaging said values over said portion.

6. The method of claim 5, wherein said values are averaged over at least the first 100 nanoseconds of said one pulse.

7. The method of claims 4, 5 or 6, wherein said steps of measuring said signal's wavelength, unambiguous phase difference and ambiguous phase difference at said first and second points further comprise the steps of:
measuring said values over a plurality of consecutive pulses of said signal at said points; and
averaging said values over said plurality of pulses.

8. The method of claim 7, wherein said values are averaged over at least 12 consecutive pulses of said signal at each said point.

9. The method of claim 4, further comprising the steps of:
computing the slant range and angular position of said emitter relative to said platform at said second point;
measuring the altitude of said platform above the ground at said second point; and
computing the Cartesian range and angular position of said emitter relative to said platform at said second point from said measured altitude and said computed slant range and angular position of said emitter at said second point.

10. A method for passive ranging from a moving platform to a stationary, non-cooperative emitter of a pulsed, frequency-agile signal, comprising the steps of:
detecting that said signal is frequency-agile;
measuring the wavelength and unambiguous phase difference of said signal over at least a portion of at least one pulse of said signal at first and second points along said platform's path with a Short Baseline Interferometer (SBI);
measuring the position and attitude of said platform at and between said points with a Navigation system (NAV);
computing the length and direction of a straight line between said points from said NAV measurements;
computing the unambiguous angular position of said emitter relative to said straight line, corrected for roll, pitch and heading of said platform, at said first and second points from said SBI and NAV measurements;
computing the unambiguous angular position of said emitter relative to the midpoint of said straight line from said computed, unambiguous angular positions at said first and second points;
measuring the frequency, wavelength and ambiguous phase difference of at least a portion of at least N pulses of said signal at each of said first and second points with a Long Baseline Interferometer (LBI) and storing said values;
comparing said stored values of frequency of said N pulses measured at each said point and pairing said pulses into at least M pairs of said pulses, each said pulse pair having one pulse from said N pulses measured at said first point and one pulse from said N pulses measured at said second point whose frequencies are within a given bandwidth of each other, and wherein $N \geq M$;
computing the ambiguous change in phase difference between said pulses in each said M pulse pair from said stored, measured values of ambiguous phase difference of said pulses;
computing the ambiguous phase correction due to difference in cable length in said LBI, if any, between the pulses in each said M pulse pair from said stored, measured values of frequency of said pulses;
computing the ambiguous phase correction due to frequency difference between the pulses in each said M pulse pair from said computed angular position of said emitter relative to said midpoint of said straight line of said stored, measured values of said wavelength of said pulses;
computing the corrected, ambiguous change in phase difference between the pulses in each said M pulse pair, corrected for said cable length and frequency differences, for each said pulse pair;
averaging said corrected, ambiguous change in phase difference computed for each said pulse pair over said M pairs of said pulses;
computing the unambiguous change in phase difference of said signal between said points, corrected for roll, pitch and heading of said platform at said points, from said computed angular positions of said emitter, said NAV measurements, and said computed, corrected, averaged ambiguous change in phase difference; and
computing the slant range and angular position of said emitter relative to the midpoint of said straight line from said measured wavelength of said signal, said computed length of said straight line, said computed angular positions of said emitter relative to said straight line at said points and said computed, unambiguous change in phase difference between said points, whereby the present angular position and range of said emitter relative to any other point in space may be computed.

11. The method of claim 10, wherein said steps of measuring said signal's wavelength, unambiguous phase difference, and ambiguous phase difference at said first and second points further comprise the steps of:
measuring said values over the initial portion of at least one pulse of said signal at said points; and
averaging said values over said portion.

12. The method of claim 11, wherein said values are averaged over at least the first 100 nanoseconds of said pulse.

13. The method of claims 10, 11, or 12, wherein said steps of measuring said signal's wavelength and unambiguous phase differences at said first and second points further comprise the steps of:
measuring said parameters over said M pulses of said signal at said points; and
averaging said values over said M pulses.

14. The method of claim 13, wherein:
said signal's wavelength and unambiguous phase difference are measured with said SBI and averaged over at least 12 of said pulses at each said point before processing;
said signal's frequency, wavelength and ambiguous phase difference are measured with said LBI over at least 14 of said pulses at said first and second points and stored; and said stored values of said LBI measurements of said 14 pulses are paired into at least 12 of said pulse pairs before further processing.

15. The method of claim 10, further comprising the steps of:
computing the slant range and angular position of said emitter relative to said platform at said second point;
measuring the altitude of said platform above the ground at said second point; and
computing the Cartesian range and angular position of said emitter relative to said platform at said second point from said measured altitude and said computed slant range and angular position of said emitter at said second point.

16. The method of claims 4 or 10, wherein the relationship between said SBI and LBI, including dimensions, mounting angles, measurement errors and vibration amplitude, satisfy the following criterion:

$$KE(\phi)\left[\frac{D_L \text{Sin}(\widehat{\theta} + \alpha + \overline{E}(\theta))}{D_S \text{Sin}(\widehat{\theta} + \beta)} + 1\right] + \frac{4\pi A_V}{\lambda} \text{Sin}(\widehat{\theta} + \alpha) \leq 2\pi,$$

wherein:
$E(\phi)$ = RMS phase measurement error (random component),
$D_L$ = LBI length,
$D_S$ = SBI length,
$\theta$ = emitter angle from the midpoint of the straight line connecting the two measurement points,
$\alpha$ = LBI angle from platform centerline,
$\beta$ = SBI angle from platform centerline,
$\overline{E}(\theta)$ = SBI bias error,
$A_V$ = LBI vibration amplitude,
$\lambda$ = Signal wavelength, and
$K$ = A constant.

17. An improved passive ranging system of the class having a Long Baseline Interferometer (LBI) mounted on a moving platform for measuring the precise but ambiguous change in phase of an emitter's signal occurring between two or more points along a path separated by arbitrary periods of time and distance, wherein the improvement comprises: a Short Baseline Interferometer (SBI) mounted on said platform for sequentially measuring said phase unambiguously at said points, means using said sequentially measured unambiguous phase for establishing a range to said emitter's signal, and means using said range for resolving the ambiguity in said LBI change in phase measurements.

18. An improved ranging system of the class having a Long Baseline Interferometer (LBI) mounted on a moving platform for measuring the precise but ambiguous change in phase of an emitter's signal occurring between two or more points along a path separated by arbitrary periods of time and distance, wherein the improvement comprises:
a Short Baseline Interferometer (SBI) mounted on said platform for sequentially measuring said phase unambiguously at said points;
means for computing the unambiguous angular position of said emitter relative to said path at said points from said SBI measurements;
means for predicting the range within which the unambiguous LBI phase difference must lie from said computed angular positions;
means for computing the integer number of $2\pi$ rotations occurring in the signal between said points from said predicted range and said ambiguous measurements; and
means for computing said unambiguous LBI change in phase between said points from said ambiguous change and said computed number of $2\pi$ rotations.

19. An apparatus for passive ranging from a moving platform to a stationary, non-cooperative emitter of a pulsed signal, comprising:
a Short Baseline Interferometer (SBI) mounted to said platform for measuring the wavelength and unambiguous phase difference of at least a portion of at least one pulse of said signal at first and second points along said platform's path;
a Long Baseline Interferometer (LBI) mounted to said platform for measuring the ambiguous phase difference of at least a portion of at least one pulse of said signal at said points, said LBI having a longer baseline than said SBI;
navigation (NAV) means for measuring the position and attitude of said platform at and between said points; and
signal processing means, including:
means for computing the length and direction of a straight line between said points from said NAV measurements;
means for computing the unambiguous angular position of said emitter relative to said straight line, corrected for roll, pitch and heading of said platform at said first and second points, from said SBI and NAV measurements;
means for computing the ambiguous change in phase difference of said signal between said points from said LBI measurements;
means for computing the unambiguous change in phase difference of said signal between said points, corrected for roll, pitch and heading of said platform at said points, from said computed angular positions, said NAV measurements, and said computed ambiguous change; and
means for computing the slant range and angular position of said emitter relative to the midpoint of said straight line from said measured wavelength of said signal, said computed length of said straight line, said computed angular positions of said emitter relative to said straight line at said points and said computed, unambiguous change in phase difference between said points, whereby the present angular position and range of said emitter relative to any other point in space may be computed.

20. The apparatus of claim 19, further comprising:
means for measuring said values of said signal's wavelength, unambiguous phase difference and ambiguous phase difference over an initial portion of a plurality of said pulses of said signal at said points and for averaging said values over said portion of said pulses.

21. The apparatus of claim 20, wherein:
said values are averaged over the first 100 nanoseconds of 12 consecutive pulses at said points.

22. The apparatus of claim 19, further comprising:
means for measuring the altitude of said platform above the ground; and wherein said signal processing means further includes means for computing the Cartesian range and angular position of said emitter relative to said platform at said second point from said measured altitude of said computed slant range and angular position of said emitter at said second point.

23. The apparatus of claims 18 or 19, wherein the relationship between said SBI and LBI, including dimensions, mounting angles, measurement errors and vibration amplitude, satisfy the following criterion:

$$KE(\phi)\left[\frac{D_L \sin(\widetilde{\theta} + \alpha + \overline{E(\theta)})}{D_S \sin(\widetilde{\theta} + \beta)} + 1\right] + \frac{4\pi A_V}{\lambda}\sin(\widetilde{\theta} + \alpha) \leq 2\pi,$$

wherein:
$E(\phi)$ = RMS phase measurement error (random component),
$D_L$ = LBI length,
$D_S$ = SBI length,
$\theta$ = emitter angle from the midpoint of the straight line connecting the two measurement points,
$\alpha$ = LBI angle from platform centerline,
$\beta$ = SBI angle from platform centerline,
$\overline{E(\theta)}$ = SBI bias error,
$A_V$ = LBI vibration amplitude,
$\lambda$ = Signal wavelength, and
$K$ = A constant.

24. An improved passive ranging method of the class which includes measuring the phase of an emitter signal from a moving platform, comprising the steps of:
sequentially measuring the precise but ambiguous changes in phase of said emitter signal occurring between a plurality of points along a path using a Long Baseline Interferometer (LBI) mounted on said moving platform to establish the difference in angle toward said emitter from said points;
sequentially measuring the unambiguous phase of said emitter signal occurring between said points along said path using a Short Baseline Interferometer (SBI) mounted on said moving platform to establish the angles toward said emitter from said points;
using said SBI angle measurements to establish an estimated range to said emitter;
using said estimated range to said emitter to resolve the ambiguity in said LBI changes in phase; and
using said resolved LBI phase to refine said range estimate.

25. An improved passive ranging system of the class which includes measuring the phase of an emitter signal from a moving platform, comprising:
a Long Baseline Interferometer (LBI) mounted upon said moving platform for sequentially measuring the precise but ambiguous changes in phase of said emitter signal occurring between a plurality of points along a path to establish the precise difference in angles towards said emitter from said points;
a Short Baseline Interferometer (SBI) mounted upon said moving platform for sequentially measuring the unambiguous phase of said emitter occurring between said points along said path to establish the angles toward said emitter from said points;
means for using said SBI angle measurements to established an estimated range to said emitter;
means for using said estimated range to said emitter to resolve the ambiguity in said LBI changes in phase; and
means for using said resolved LBI phase to refine said range estimate.

* * * * *